US010523281B2

(12) United States Patent
John Wilson et al.

(10) Patent No.: US 10,523,281 B2
(45) Date of Patent: Dec. 31, 2019

(54) SENSOR BASED BEAM TRACKING FOR WIRELESS COMMUNICATION

(71) Applicant: QUALCOMM Incorporated, San Diego, CA (US)

(72) Inventors: Makesh Pravin John Wilson, San Diego, CA (US); Sumeeth Nagaraja, San Diego, CA (US); Tao Luo, San Diego, CA (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 147 days.

(21) Appl. No.: 15/377,897

(22) Filed: Dec. 13, 2016

(65) Prior Publication Data
US 2017/0359106 A1 Dec. 14, 2017

Related U.S. Application Data

(60) Provisional application No. 62/348,680, filed on Jun. 10, 2016.

(51) Int. Cl.
| | | |
|---|---|---|
| *H04W 4/00* | (2018.01) | |
| *H04B 7/0408* | (2017.01) | |
| *H04B 17/318* | (2015.01) | |
| *H04B 7/06* | (2006.01) | |
| *H04W 88/02* | (2009.01) | |
| *H04W 88/08* | (2009.01) | |

(52) U.S. Cl.
CPC ......... *H04B 7/0408* (2013.01); *H04B 7/0617* (2013.01); *H04B 17/318* (2015.01); *H04B 7/0691* (2013.01); *H04W 88/02* (2013.01); *H04W 88/08* (2013.01)

(58) Field of Classification Search
None
See application file for complete search history.

(56) References Cited

U.S. PATENT DOCUMENTS

| | | | | |
|---|---|---|---|---|
| 2010/0291931 | A1* | 11/2010 | Suemitsu | H04W 36/245 455/436 |
| 2013/0029681 | A1* | 1/2013 | Grokop | G01C 21/16 455/456.1 |
| 2013/0059620 | A1* | 3/2013 | Cho | H04W 16/28 455/515 |
| 2014/0045505 | A1* | 2/2014 | Henry | H04W 36/0061 455/444 |
| 2014/0140426 | A1 | 5/2014 | Dinur et al. | |

(Continued)

OTHER PUBLICATIONS

International Search Report and Written Opinion—PCT/US2017/034757—ISA/EPO—dated Aug. 17, 2017.

*Primary Examiner* — Kwang B Yao
*Assistant Examiner* — Juvena W Loo
(74) *Attorney, Agent, or Firm* — Loza & Loza, LLP

(57) ABSTRACT

Some aspects of the present disclosure provide systems and methods for utilizing information from inbuilt sensors of a wireless apparatus along with radio frequency (RF) measurements to assist and/or trigger a beam tracking operation. Some aspects of the present disclosure provide systems and methods for utilizing information available from inbuilt sensors of a wireless apparatus and RF measurements along with historical mobility information to assist a mobility operation such as an initial beam search, a neighbor beam search, and handovers.

28 Claims, 12 Drawing Sheets

(56) References Cited

U.S. PATENT DOCUMENTS

| | | |
|---|---|---|
| 2014/0293870 A1 | 10/2014 | Li et al. |
| 2015/0264583 A1 | 9/2015 | Sundström et al. |
| 2016/0118716 A1* | 4/2016 | Stephenne ............... H01Q 3/34 342/372 |
| 2016/0182163 A1* | 6/2016 | Guey .................. H04B 17/318 455/63.4 |
| 2017/0374587 A1* | 12/2017 | Liu ....................... H04L 5/0048 |

* cited by examiner

SENSOR BASED BEAM TRACKING FOR WIRELESS COMMUNICATION

PRIORITY CLAIM

This application claims priority to and the benefit of provisional patent application No. 62/348,680 filed in the United States Patent and Trademark Office on 10 Jun. 2016, the entire content of which is incorporated herein by reference as if fully set forth below in its entirety and for all applicable purposes.

TECHNICAL FIELD

The technology discussed below relates generally to wireless communication systems, and more particularly, to sensor assisted beam tracking in wireless communication systems.

INTRODUCTION

Next generation wireless communication systems or 5G wireless systems may operate at a higher frequency range than the current third generation (3G) and fourth generation (4G) wireless systems in order to achieve higher data rates that can accommodate ever increasing data demand. Examples of higher frequencies may include millimeter wave (mmWave) frequencies such as 28 gigahertz (GHz), 60 GHz, and higher frequencies. In the related art, mmWave frequencies may be called extreme high frequency that can range from 30 GHz to 3000 GHz.

As compared to lower frequencies (e.g., 6 GHz frequencies or below), mmWave frequencies have significantly higher attenuation. Moreover, due to its short wavelength, mmWave frequencies or extreme high frequencies are highly susceptible to blockage of the propagation path. Beamforming techniques may be used to counteract or reduce the effect of attenuation and provide a highly directional communication beam that uses the wireless communication channels more effectively. Beamforming generally utilizes an array of antennas configured for directional signal transmission or reception. To transmit a beam by beamforming, the phase and relative amplitude of the signal transmitted by each transmitter or antenna are controlled such that a pattern of constructive and destructive interference in the wavefront is created. At the receiver, signals from different antennas or sensors are combined to recover the beamformed signal.

As the demand for mobile broadband access continues to increase, research and development continue to advance wireless communication technologies not only to meet the growing demand for mobile broadband access, but to advance and enhance the user experience with mobile communications.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

One aspect of the present disclosure provides a method of wireless communication operable at a wireless apparatus. The wireless apparatus communicates with a network utilizing one or more beams. The wireless apparatus collects sensor information from one or more sensors of the wireless apparatus and determines one or more radio frequency (RF) measurements of the one or more beams. The wireless apparatus further determines whether a sensor-assisted beam tracking event (SBT Event) is triggered based on at least one of the sensor information or the RF measurements, and performs a beam tracking operation if the SBT Event is triggered. The SBT Event may include an UE initiated UL transmission, for example to request beam tracking reference signals (beam-tracking resources) from a base station eNodeB. Another reason for UE initiated UL transmission is to report reasons for triggering SBT, for example change in UE orientation, blocking, SNR degradation etc.

Another aspect of the present disclosure provides a method of wireless communication operable at a wireless apparatus. The wireless apparatus stores mobility history including previous mobility information with associated sensor information and radio frequency (RF) measurements of one or more beams. The wireless apparatus collects current sensor information from one or more sensors of the wireless apparatus and determines current RF measurements of the one or more beams. The wireless apparatus further determines at least one of a location, an orientation, a displacement, or a shadowing of the wireless apparatus based on the current sensor information and current RF measurements. The wireless apparatus performs a mobility operation based on a correlation between the mobility history and at least one of the current sensor information or current RF measurements.

Another aspect of the present disclosure provides a wireless apparatus for wireless communication. The wireless apparatus includes a communication interface configured to communicate with a network utilizing one or more beams, a memory stored with executable code, and one or more sensors. The wireless apparatus further includes a processor operatively coupled with the communication interface, the one or more sensors, and the memory. The processor is configured by the executable code to collect sensor information from the one or more sensors, determine one or more radio frequency (RF) measurements of the one or more beams, determine whether a sensor-assisted beam tracking event (SBT Event) is triggered based on at least one of the sensor information or the RF measurements, and perform a beam tracking operation if the SBT Event is triggered.

Another aspect of the present disclosure provides a wireless apparatus including a communication interface configured to communicate with a network utilizing one or more beams, one or more sensors configured to provide sensor information, and a memory stored with executable code. The wireless apparatus further includes a processor operatively coupled with the communication interface, the one or more sensors, and the memory. The processor is configured by the executable code to store mobility history including previous mobility information with the associated sensor information and radio frequency (RF) measurements of the one or more beams, and collect current sensor information from the one or more sensors, and determine current RF measurements of the one or more beams. The processor is further configured to determine at least one of a location, an orientation, a displacement, or a shadowing of the wireless apparatus based on the current sensor information and current RF measurements. The processor is further configured to perform a mobility operation based on a correlation between the mobility history and at least one of the current sensor information or current RF measurements.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Some aspects of the present disclosure provide systems and methods for utilizing information from inbuilt sensors of a wireless apparatus along with radio frequency (RF) measurements to assist and/or trigger a beam tracking operation. Some aspects of the present disclosure provide systems and methods for utilizing information available from inbuilt sensors of a wireless apparatus and RF measurements along with historical mobility information to assist a mobility operation such as an initial beam search, a neighbor beam search, and handovers.

Figure 1:
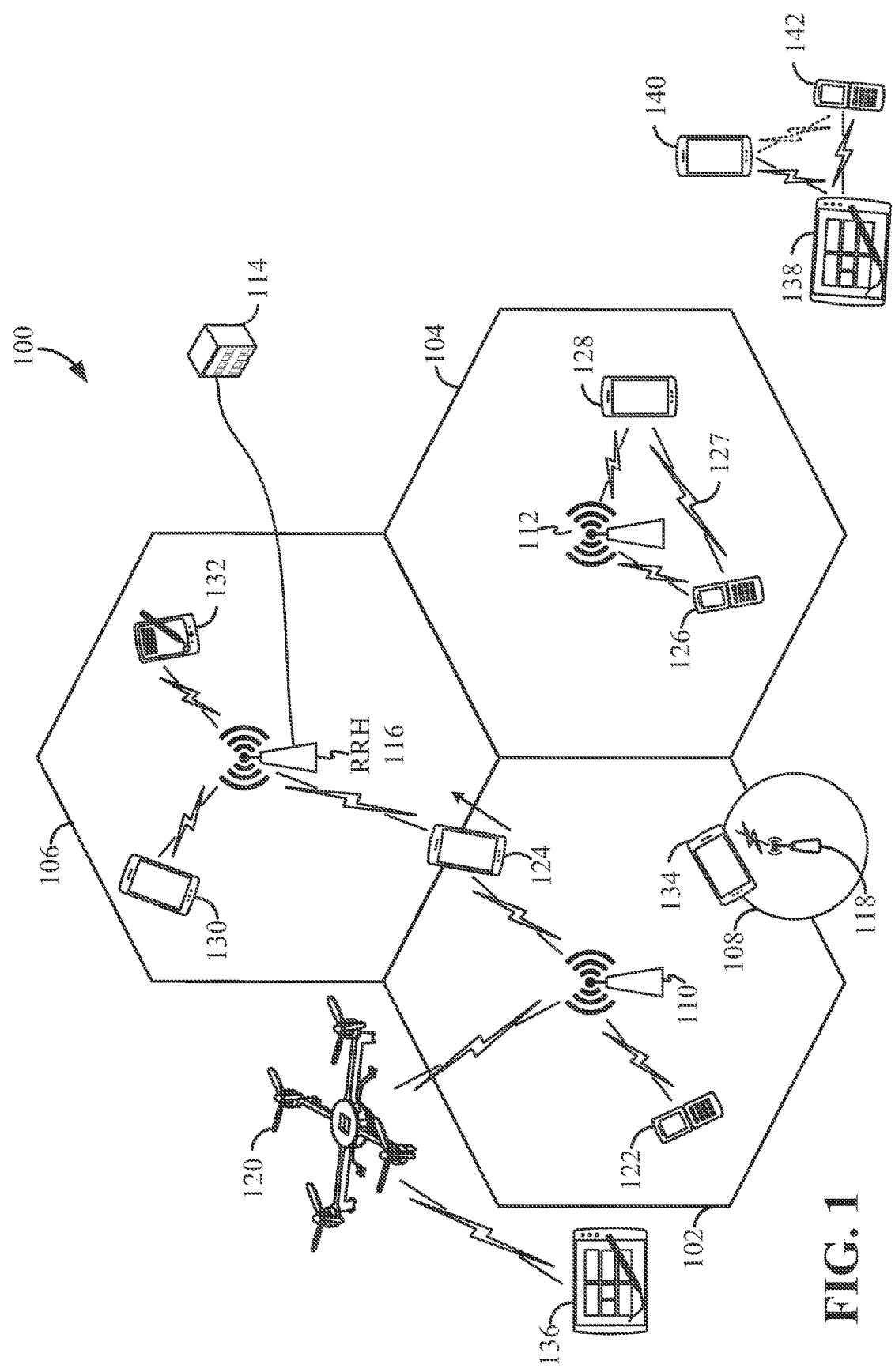
FIG. 1 is a conceptual diagram illustrating an example of an access network according to an aspect of the disclosure.

The various concepts presented throughout this disclosure may be implemented across a broad variety of telecommunication systems, network architectures, and communication standards. Referring now to FIG. 1, as an illustrative example without limitation, a schematic illustration of a radio access network 100 is provided.

The geographic region covered by the radio access network 100 may be divided into a number of cellular regions (cells) that can be uniquely identified by a user equipment (UE) based on an identification broadcasted over a geographical area from one access point or base station. FIG. 1 illustrates macrocells 102, 104, and 106, and a small cell 108, each of which may include one or more sectors. A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In general, a base station (BS) serves each cell. Broadly, a base station is a network element in a radio access network responsible for radio transmission and reception in one or more cells to or from a UE. A BS may also be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), or some other suitable terminology.

In FIG. 1, two high-power base stations 110 and 112 are shown in cells 102 and 104; and a third high-power base station 114 is shown controlling a remote radio head (RRH) 116 in cell 106. That is, a base station can have an integrated antenna or can be connected to an antenna or RRH by feeder cables. In the illustrated example, the cells 102, 104, and 106 may be referred to as macrocells, as the high-power base stations 110, 112, and 114 support cells having a large size. Further, a low-power base station 118 is shown in the small cell 108 (e.g., a microcell, picocell, femtocell, home base station, home Node B, home eNode B, etc.) which may overlap with one or more macrocells. In this example, the cell 108 may be referred to as a small cell, as the low-power base station 118 supports a cell having a relatively small size. Cell sizing can be done according to system design as well as component constraints. It is to be understood that the radio access network 100 may include any number of wireless base stations and cells. Further, a relay node may be deployed to extend the size or coverage area of a given cell. The base stations 110, 112, 114, 118 provide wireless access points to a core network for any number of mobile apparatuses.

FIG. 1 further includes a quadcopter or drone 120, which may be configured to function as a base station. That is, in some examples, a cell may not necessarily be stationary, and the geographic area of the cell may move according to the location of a mobile base station such as the quadcopter 120.

In general, base stations may include a backhaul interface for communication with a backhaul portion of the network. The backhaul may provide a link between a base station and a core network, and in some examples, the backhaul may provide interconnection between the respective base stations. The core network is a part of a wireless communication system that is generally independent of the radio access technology (RAT) used in the radio access network. Various types of backhaul interfaces may be employed, such as a direct physical connection, a virtual network, or the like using any suitable transport network. Some base stations may be configured as integrated access and backhaul (IAB) nodes, where the wireless spectrum may be used both for access links (i.e., wireless links with UEs), and for backhaul links. This scheme is sometimes referred to as wireless self-backhauling. By using wireless self-backhauling, rather than requiring each new base station deployment to be outfitted with its own hard-wired backhaul connection, the wireless spectrum utilized for communication between the base station and UE may be leveraged for backhaul communication, enabling fast and easy deployment of highly dense small cell networks.

The radio access network 100 is illustrated supporting wireless communication for multiple mobile apparatuses. A mobile apparatus is commonly referred to as user equipment (UE) in standards and specifications promulgated by the 3rd Generation Partnership Project (3GPP), but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Within the radio access network 100, the cells may include UEs that may be in communication with one or more sectors of each cell. For example, UEs 122 and 124 may be in communication with base station 110; UEs 126 and 128 may be in communication with base station 112; UEs 130 and 132 may be in communication with base station 114 by way of RRH 116; UE 134 may be in communication with low-power base station 118; and UE 136 may be in communication with mobile base station 120. Here, each base station 110, 112, 114, 118, and 120 may be configured to provide an access point to a core network (not shown) for all the UEs in the respective cells.

In another example, a mobile network node (e.g., quadcopter 120) may be configured to function as a UE. For example, the quadcopter 120 may operate within cell 102 by communicating with base station 110. In some aspects of the disclosure, two or more UE (e.g., UEs 126 and 128) may communicate with each other using peer to peer (P2P) or sidelink signals 127 without relaying that communication through a base station (e.g., base station 112).

Unicast or broadcast transmissions of control information and/or data from a base station (e.g., base station 110) to one or more UEs (e.g., UEs 122 and 124) may be referred to as downlink (DL) transmission, while transmissions of control information and/or data originating at a UE (e.g., UE 122) may be referred to as uplink (UL) transmissions. In addition, the uplink and/or downlink control information and/or data may be transmitted in transmission time intervals (TTIs). As used herein, the term TTI may refer to the inter-arrival time of a given schedulable set of data. In various examples, a TTI may be configured to carry one or more transport blocks, which are generally the basic data unit exchanged between the physical layer (PHY) and medium access control (MAC) layer (sometimes referred to as a MAC PDU, or protocol data unit). In accordance with various aspects of the present disclosure, a subframe may include one or more TTIs. Thus, as further used herein, the term subframe may refer to an encapsulated set of information including one or more TTIs, which is capable of being independently decoded. Multiple subframes may be grouped together to form a single frame or radio frame. Any suitable number of subframes may occupy a frame. In addition, a subframe may have any suitable duration (e.g., 250 μs, 500 μs, 1 ms, etc.).

The air interface in the radio access network 100 may utilize one or more multiplexing and multiple access algorithms to enable simultaneous communication of the various devices. For example, multiple access for uplink (UL) or reverse link transmissions from UEs 122 and 124 to base station 110 may be provided utilizing time division multiple access (TDMA), code division multiple access (CDMA), frequency division multiple access (FDMA), orthogonal frequency division multiple access (OFDMA), sparse code multiple access (SCMA), resource spread multiple access (RSMA), or other suitable multiple access schemes. Further, multiplexing downlink (DL) or forward link transmissions from the base station 110 to UEs 122 and 124 may be provided utilizing time division multiplexing (TDM), code division multiplexing (CDM), frequency division multiplexing (FUM), orthogonal frequency division multiplexing (OFDM), sparse code multiplexing (SCM), or other suitable multiplexing schemes.

In the access network 100, a scheduling entity (e.g., a base station) and a scheduled entity (e.g., an UE) may communicate with each other using one or more directional beams (e.g., mmWave beams or extreme high frequency beams). A "beam" generally refers to a focused, steered, or directional transmission of signals in a certain spatial direction or pattern (e.g., beams 503 and 504 of FIG. 5). The scheduling entity and/or the scheduled entity each may include an array of antennas configured to perform beamforming. The term "beamforming" is a well-known signal processing techniques that use multiple transmitters/antennas to manipulate directional signal transmission or reception. The antennas may be steered or manipulated electrically or mechanically. One technique is to combine signals in an antenna array in a way that signals transmitted at particular angles experience constructive interference, while other signals experience destructive interference. A transmitter (e.g., a base station or a scheduling entity) and a receiver (e.g., an UE or a scheduled entity) may initially exchange a sequence of beamforming training frames in order to determine the appropriate antenna system settings for both transmission and reception of beams using beamforming. For example, a precoding technique may be used to determine the weighting information (phase and gain) of the signal streams. By using different weighting information, different beams may be transmitted and received.

In the radio access network 100, the ability for a UE to communicate while moving, independent of their location, is referred to as mobility. The various physical channels between the UE and the radio access network are generally set up, maintained, and released under the control of a mobility management entity (MME). In various aspects of the disclosure, a radio access network 100 may utilize DL-based mobility or UL-based mobility to enable mobility and handovers (i.e., the transfer of a UE's connection from one radio channel to another). It is a mobility event when the UE hands over from one cell to another cell. Other examples of mobility events are serving beam search and neighbor beam search.

In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 124 may move from the geographic area corresponding to its serving cell 102 to the geographic area corresponding to a neighbor cell 106. When the signal strength or quality from the neighbor cell 106 exceeds that of its serving cell 102 for a given amount of time, the UE 124 may transmit a reporting message to its serving base station 110 indicating this condition. In response, the UE 124 may receive a handover command, and the UE may undergo a handover to the cell 106.

In a network configured for UL-based mobility, UL reference signals from each UE may be utilized by the network to select a serving cell for each UE. In some examples, the base stations 110, 112, and 114/116 may broadcast unified synchronization signals (e.g., unified Primary Synchronization Signals (PSSs), unified Secondary Synchronization Signals (SSSs) and unified Physical Broadcast Channels (PBCH)). The UEs 122, 124, 126, 128, 130, and 132 may receive the unified synchronization signals, derive the carrier frequency and subframe timing from the synchronization signals, and in response to deriving timing, transmit an uplink pilot or reference signal. The uplink pilot signal transmitted by a UE (e.g., UE 124) may be concurrently received by two or more cells (e.g., base stations 110 and 114/116) within the radio access network 100. Each of the cells may measure a strength of the pilot signal, and the radio access network (e.g., one or more of the base stations 110 and 114/116 and/or a central node within the core network) may determine a serving cell for the UE 124. As the UE 124 moves through the radio access network 100, the network may continue to monitor the uplink pilot signal transmitted by the UE 124. When the signal strength or quality of the pilot signal measured by a neighboring cell exceeds that of the signal strength or quality measured by the serving cell, the network 100 may handover the UE 124 from the serving cell to the neighboring cell, with or without informing the UE 124.

Although the synchronization signal transmitted by the base stations 110, 112, and 114/116 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 100 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple radio access technologies (RATs). For example, the holder of a license for a portion of licensed spectrum may provide licensed shared access (LSA) to share that spectrum with other parties, e.g., with suitable licensee-determined conditions to gain access.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs or scheduled entities utilize resources allocated by the scheduling entity.

Base stations are not the only entities that may function as a scheduling entity. That is, in some examples, a UE may function as a scheduling entity, scheduling resources for one or more scheduled entities (e.g., one or more other UEs). In other examples, sidelink signals may be used between UEs without necessarily relying on scheduling or control information from a base station. For example, UE 138 is illustrated communicating with UEs 140 and 142. In some examples, the UE 138 is functioning as a scheduling entity or a primary sidelink device, and UEs 140 and 142 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 140 and 142 may optionally communicate directly with one another in addition to communicating with the scheduling entity 138.

Figure 2:
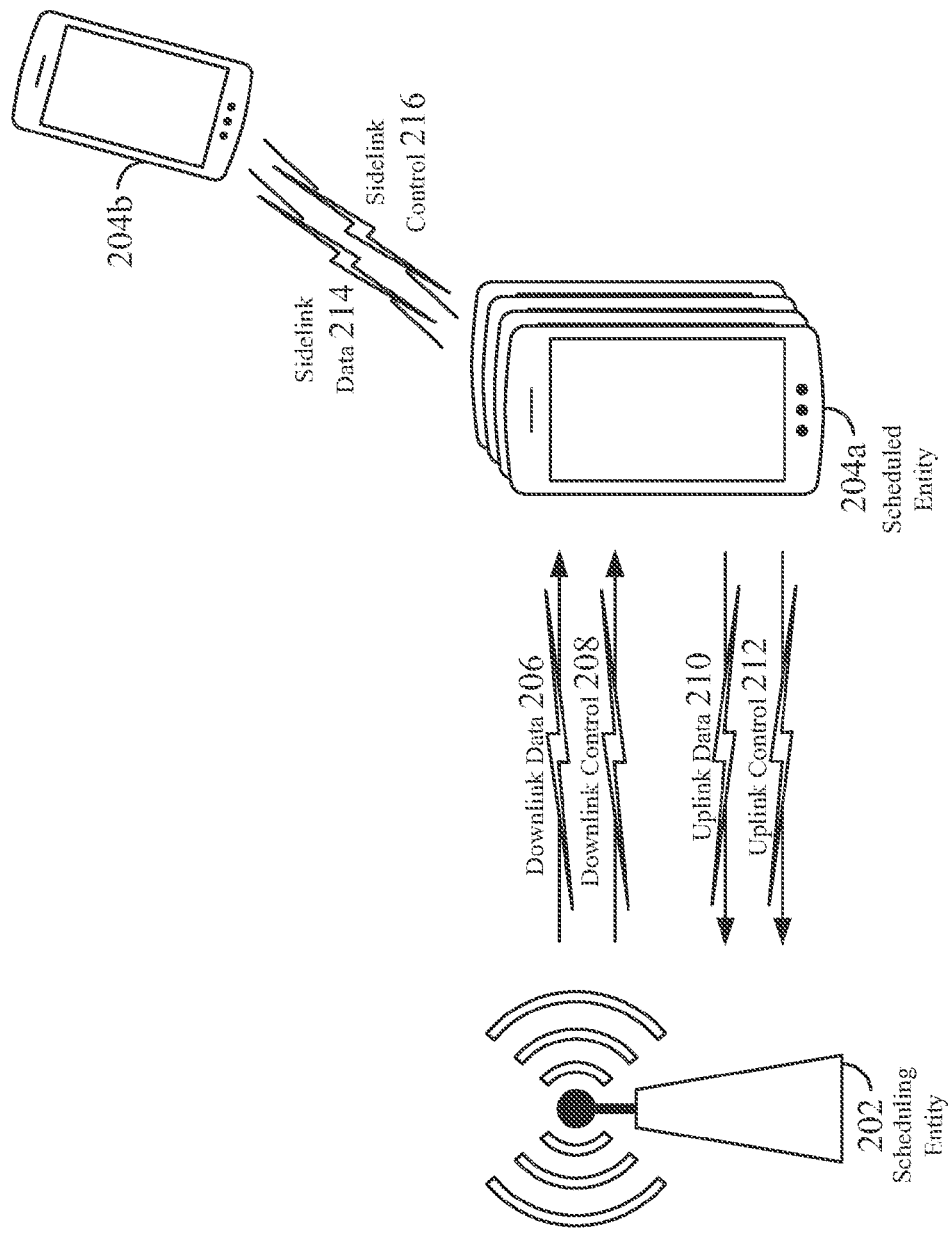
FIG. 2 is a block diagram conceptually illustrating an example of a scheduling entity communicating with one or more scheduled entities according to some aspects of the disclosure.

Thus, in a wireless communication network with scheduled access to time-frequency resources and having a cellular configuration, a P2P configuration or a mesh configuration, a scheduling entity and one or more scheduled entities may communicate utilizing the scheduled resources. Referring now to FIG. 2, a block diagram illustrates a scheduling entity 202 and a plurality of scheduled entities 204 (e.g., 204*a* and 204*b*). Here, the scheduling entity 202 may correspond to the base stations 110, 112, 114, and/or 118. In additional examples, the scheduling entity 202 may correspond to the UE 138, the quadcopter 120, or any other suitable node in the access network 100. Similarly, in various examples, the scheduled entity 204 may correspond to the UE 122, 124, 126, 128, 130, 132, 134, 136, 138, 140, and 142, or any other suitable node in the radio access network 100.

As illustrated in FIG. 2, the scheduling entity 202 may broadcast data 206 to one or more scheduled entities 204 (the data may be referred to as downlink data). In accordance with certain aspects of the present disclosure, the term downlink may refer to a point-to-multipoint transmission originating at the scheduling entity 202. Broadly, the scheduling entity 202 is a node or device responsible for scheduling traffic in a wireless communication network, including the downlink transmissions and, in some examples, uplink data 210 from one or more scheduled entities to the scheduling entity 202. Another way to describe the system may be to use the term broadcast channel multiplexing. In accordance with aspects of the present disclosure, the term uplink may refer to a point-to-point transmission originating at a scheduled entity 204. Broadly, the scheduled entity 204 is a node or device that receives scheduling control information, including but not limited to scheduling grants, synchronization or timing information, or other control information from another entity in the wireless communication network such as the scheduling entity 202. In some examples, a scheduled entity may also be called a subordinate entity.

The scheduling entity 202 may broadcast control information 208 including one or more control channels, such as a PBCH; a PSS; a SSS; a physical control format indicator channel (PCFICH); a physical hybrid automatic repeat request (HARQ) indicator channel (PHICH); and/or a physical downlink control channel (PDCCH), etc., to one or more scheduled entities 204. The PHICH carries HARQ feedback transmissions such as an acknowledgment (ACK) or negative acknowledgment (NACK). HARQ is a technique well-known to those of ordinary skill in the art, wherein packet transmissions may be checked at the receiving side for accuracy, and if confirmed, an ACK may be transmitted, whereas if not confirmed, a NACK may be transmitted. In response to a NACK, the transmitting device may send a HARQ retransmission, which may implement chase combining, incremental redundancy, etc.

Uplink data 210 and/or downlink data 206 including one or more data channels, such as a physical downlink shared channel (PDSCH) or a physical uplink shared channel (PUSCH) (and, in some examples, system information blocks (SIBs)), may additionally be transmitted between the scheduling entity 202 and the scheduled entity 204. Transmissions of the control and data information may be organized by subdividing a carrier, in time, into suitable transmission time intervals (TTIs).

When beamforming is used, the scheduling entity 202 may transmit beamforming control signaling to the scheduled entity 204. The beamforming control information provides the scheduled entity with the information (e.g., beamforming weights) to perform beamforming communication with the scheduling entity using one or more beams. The scheduled entity 204 may also transmit similar beamforming control information to the scheduling entity 202.

In some examples, scheduled entities such as a first scheduled entity 204*a* and a second scheduled entity 204*b* may utilize sidelink signals for direct D2D communication. Sidelink signals may include sidelink data 214 and sidelink control 216. Sidelink control information 216 may include a request-to-send (RTS) channel and a clear-to-send (CTS) channel. The RTS may provide for a scheduled entity 204 to request a duration of time to keep a sidelink channel available for a sidelink signal; and the CTS may provide for the scheduled entity 204 to indicate the availability of the sidelink channel, e.g., for a requested duration of time. An exchange of RTS and CTS signals (e.g., handshake) may enable different scheduled entities performing sidelink communications to negotiate the availability of the sidelink channel prior to communication of the sidelink data information 214.

The channels or carriers illustrated in FIG. 2 are not necessarily all of the channels or carriers that may be utilized between a scheduling entity 202 and scheduled entities 204, and those of ordinary skill in the art will recognize that other channels or carriers may be utilized in addition to those illustrated, such as other data, control, and feedback channels.

Figure 3:
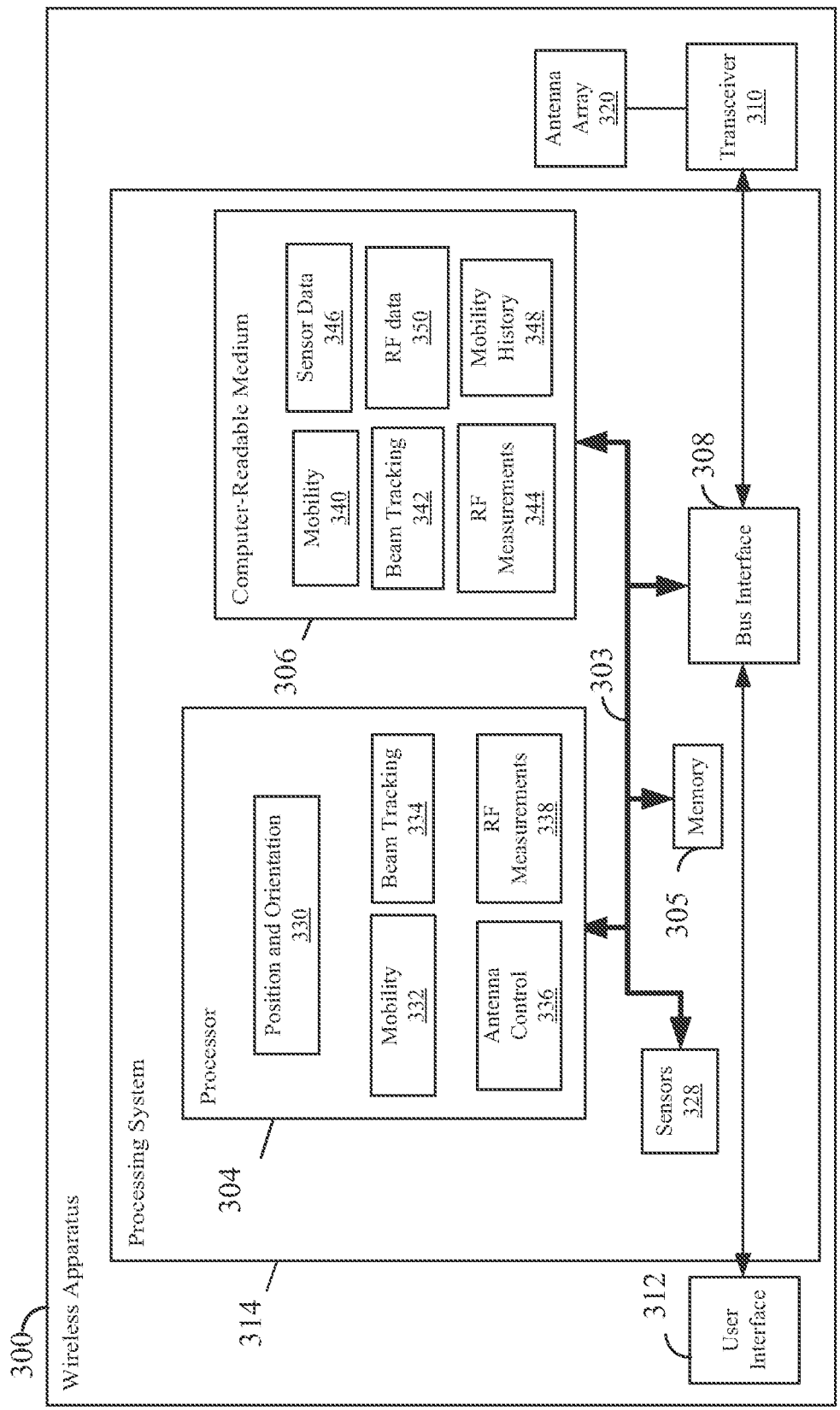
FIG. 3 is a block diagram illustrating an example of a hardware implementation for a wireless apparatus employing a processing system according to some aspects of the disclosure.

FIG. 3 is a block diagram illustrating an example of a hardware implementation for a wireless apparatus 300 employing a processing system 314. For example, the wireless apparatus 300 may be a user equipment (UE) or scheduled entity as illustrated in any one or more of FIGS. 1, 2, 4, and/or 5. In another example, the wireless apparatus 300 may be a base station or scheduling entity as illustrated in any one or more of FIGS. 1, 2, 4, and/or 5. The wireless apparatus 300 may be operated as a scheduling entity and/or a scheduled entity in various aspects of the present disclosure.

The wireless apparatus 300 may be implemented with a processing system 314 that includes one or more processors 304. Examples of processors 304 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the wireless apparatus 300 may be configured to perform any one or more of the functions described herein. That is, the processor 304, as utilized in a wireless apparatus 300, may be used to implement any one or more of the processes and methods described below and illustrated in FIGS. 6-12.

In this example, the processing system 314 may be implemented with a bus architecture, represented generally by the bus 302. The bus 302 may include any number of interconnecting buses and bridges depending on the specific application of the processing system 314 and the overall design constraints. The bus 302 communicatively couples together various circuits including one or more processors (represented generally by the processor 304), a memory 305, and computer-readable media (represented generally by the computer-readable medium 306). The bus 302 may also link various other circuits such as timing sources, sensors, peripherals, voltage regulators, and power management circuits, which are well known in the art, and therefore, may not be described any further. A bus interface 308 provides an interface between the bus 302 and a transceiver 310. The transceiver 310 provides a communication interface or a means for communicating with various other apparatus over a transmission medium. The transceiver 310 may be configured to utilize an antenna array 320 to perform beamforming wireless communication. The antenna array 320 may include a number of antennas (e.g., two or more) that may be steered mechanically or electrically. Depending upon the nature of the apparatus, a user interface 312 (e.g., keypad, display, speaker, microphone, joystick, touchscreen) may also be provided.

The processor 304 is responsible for managing the bus 302 and general processing, including the execution of software stored on the computer-readable medium 306. The software, when executed by the processor 304, causes the processing system 314 to perform the various functions described below for any particular apparatus. The computer-readable medium 306 and the memory 305 may also be used for storing data that is manipulated by the processor 304 when executing software.

The processor 304 may include a position-and-orientation (P-O) block 330, a mobility block 332, a beam tracking block 334, an antenna control block 336, and an RF measurements block 338. The P-O block 330 may be configured to utilize one or more inbuilt sensors 328 to determine the position, acceleration, orientation, rotation, movement, and/or displacement of the apparatus. In some examples, the sensors 328 may include one or more of accelerometer, gyroscope, satellite positioning system (e.g., Global Positioning System (GPS), Globalnaya Navigazionnaya Sputnikovaya Sistema (GLONASS), Galileo, BeiDou Navigation Satellite System (BDS)), magnetometer, and/or any sensors or devices that can provide information such as the orientation, movement, and/or position of the wireless apparatus 300.

The mobility block 332 may be configured to perform various functions related to mobility, for example, performing a mobility operation based on a correlation between mobility history and sensor information and/or RF measurements. The mobility block 332 may be configured to partition historical mobility information along with the corresponding sensor information and RF measurements into a plurality of clusters or regions that may be used to control mobility as described herein. The beam tracking block 334 may be configured to perform various beam tracking related operations as described for example in relation to FIGS. 6-7. The antenna control block 336 may be configured to select or control antennas of an antenna array during beamforming operations as described for example in relation to FIGS. 6-12. The RF measurements block 338 may be configured to determine various RF measurements of beams or signals such as received signal strength indicator (RSSI) measurement, reference signal received power (RSRP), signal-to-noise ratio (SNR), and the like.

One or more processors 304 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 306. The computer-readable medium 306 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 306 may reside in the processing system 314, external to the processing system 314, or distributed across multiple entities including the processing system 314. The computer-readable medium 306 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 306 may include software, instructions, and/or code for configuring the wireless apparatus 300 (e.g., processor 304) to implement one or more of the functions and processes described in relation to FIGS. 6-12. In one aspect of the disclosure, the computer-readable storage medium 306 may include mobility code 340, beam tracking code 342, and RF measurements code 344. The mobility code 340 when executed by the processor 304 may configure the processor 304 to perform various functions and processes related to mobility as described in FIGS. 6-12. The beam tracking code 342 when executed by the processor 304 may configure the processor 304 to perform various functions and processes related to beam tracking as described in FIGS. 6-12. The RF measurements code 344 when executed by the processor 304 may configure the processor 304 to perform various functions and processes related to RF measurements as described in FIGS. 6-12. The computer-readable storage 306 and/or memory 305 may also be used to store various data such as sensor data 346, mobility history 348, RF data 350, and other data during the operation of the processor 304.

Figure 4:
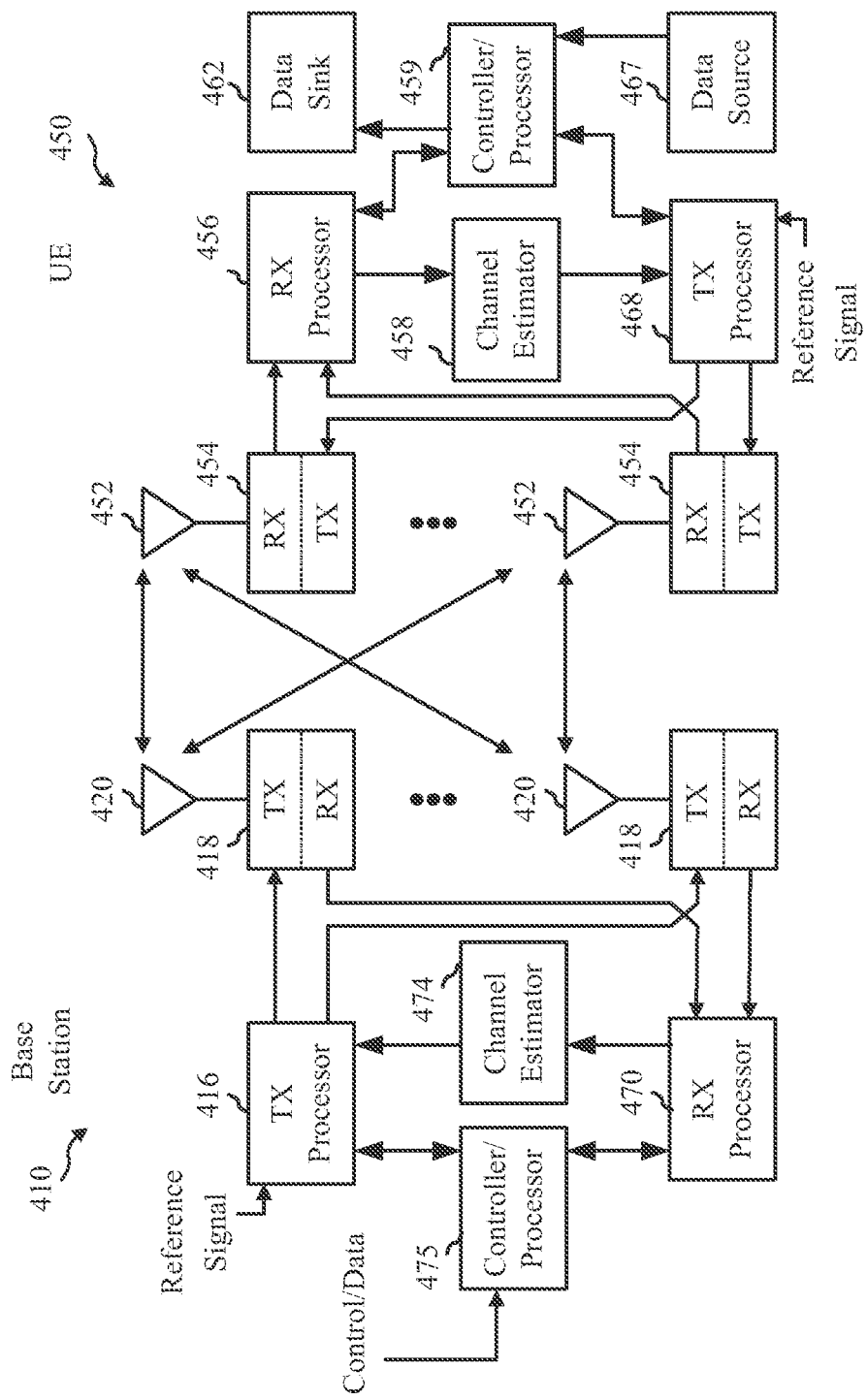
FIG. 4 is a block diagram conceptually illustrating an example of a base station in communication with a user equipment in a telecommunications system according to some aspects of the disclosure.

FIG. 4 is a block diagram of a base station 410 in communication with a UE 450 in a radio access network according to an aspect of the disclosure. The base station 410 and UE 450 may be the same as those illustrated in FIGS. 1, 2 and/or 5. In some aspects of the disclosure, the base station 410 may be an apparatus (e.g., a scheduling entity) that communicates with the UE 450 (e.g., a scheduled entity) via a peer-to-peer communication scheme or sidelink. In the DL, upper layer packets from a core network are provided to a controller/processor 475. The controller/processor 475 implements the functionality of the L2 layer (e.g., radio control link layer and media access control layer). In the DL, the controller/processor 475 provides header compression, ciphering, packet segmentation and reordering, multiplexing between logical and transport channels, and radio resource allocations to the UE 450 based on various priority metrics. The controller/processor 475 is also responsible for HARQ operations, retransmission of lost packets, and signaling to the UE 450.

The TX processor 416 implements various signal processing functions for the L1 layer (i.e., physical layer). The signal processing functions may include coding and interleaving to facilitate forward error correction (FEC) at the UE 450 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 474 may be used to determine the coding and modulation scheme, as well as for spatial processing. The channel estimate may be derived from a reference signal and/or channel condition feedback transmitted by the UE 450. Each spatial stream is then provided to a different antenna 420 via a separate transmitter 418TX. Each transmitter 418TX modulates an RF carrier with a respective spatial stream for transmission. In some examples, the antennas 420 and the transmitters 418TX may be configured to transmit one or more beams using beamforming.

At the UE 450, each receiver 454RX receives a signal through its respective antenna 452. Each receiver 454RX recovers information modulated onto an RF carrier and provides the information to the receiver (RX) processor 456. In some examples, the antennas 452 and/or the receivers 454RX may be configured to receive one or more beams using beamforming processing. In some examples, the receivers 454RX may be configured to select, steer, and/or control the antennas 452 to track one or more beams assisted by information from inbuilt sensors (e.g., sensors 330 of FIG. 3) and RF measurements.

The RX processor 456 implements various signal processing functions of the L1 layer. The RX processor 456 performs spatial processing on the information to recover any spatial streams or beams destined for the UE 450. If multiple spatial streams are destined for the UE 450, they may be combined by the RX processor 456 into a single OFDM symbol stream. The RX processor 456 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the base station 410. These soft decisions may be based on channel estimates computed by the channel estimator 458. The soft decisions are then decoded and deinterleaved to recover the data and control signals that were originally transmitted by the base station 410 on the physical channel. The data and control signals are then provided to the controller/processor 459.

The controller/processor 459 implements the L2 layer. In the UL, the control/processor 459 provides demultiplexing between transport and logical channels, packet reassembly, deciphering, header decompression, control signal processing to recover upper layer packets from the core network. The upper layer packets are then provided to a data sink 462, which represents all the protocol layers above the L2 layer. Various control signals may also be provided to the data sink 462 for L3 processing (radio resource control). The controller/processor 459 is also responsible for error detection using an acknowledgement (ACK) and/or negative acknowledgement (NACK) protocol to support HARQ operations.

In the UL, a data source 467 is used to provide upper layer packets to the controller/processor 459. The data source 467 represents all protocol layers above the L2 layer (L2). Similar to the functionality described in connection with the DL transmission by the base station 410, the controller/processor 459 implements the L2 layer for the user plane and the control plane by providing header compression, ciphering, packet segmentation and reordering, and multiplexing between logical and transport channels based on radio resource allocations by the base station 410. The controller/processor 459 is also responsible for HARQ operations, retransmission of lost packets, and signaling to the base station 410.

Channel estimates derived by a channel estimator 458 from a reference signal or feedback transmitted by the base station 410 may be used by the TX processor 468 to select the appropriate coding and modulation schemes, and to facilitate spatial processing. The spatial streams generated by the TX processor 468 are provided to different antenna 452 via separate transmitters 454TX. Each transmitter 454TX modulates an RF carrier with a respective spatial stream for transmission. In some examples, the antennas 452 and the transmitters 454TX may be configured to transmit one or more beams using beamforming.

The UL transmission is processed at the base station 410 in a manner similar to that described in connection with the receiver function at the UE 450. Each receiver 418RX receives a signal through its respective antenna 420. Each receiver 418RX recovers information modulated onto an RF carrier and provides the information to a RX processor 470. The RX processor 470 implements the L1 layer. In some examples, the antennas 420 and the receivers 418RX may be configured to receive one or more beams using beamforming.

The controller/processor 459 implements the L2 layer. In the UL, the control/processor 459 provides demultiplexing between transport and logical channels, packet reassembly, deciphering, header decompression, control signal processing to recover upper layer packets from the UE 450. Upper layer packets from the controller/processor 475 may be provided to the core network. The controller/processor 459 is also responsible for error detection using an ACK and/or NACK protocol to support HARQ operations.

In some aspects of the disclosure, the base station 410 may communicate with the UE 450 utilizing beamforming. Beamforming can be used at both the transmitting end and the receiving end in order to achieve spatial selectivity. The wireless apparatus 300 described in relation to FIG. 3 may include the components of UE 450 or base station 410 described above. For example, the processing system 314 may include the antennas 452, TX processor 468, RX processor 456, and controller/processor 459.

Figure 5:
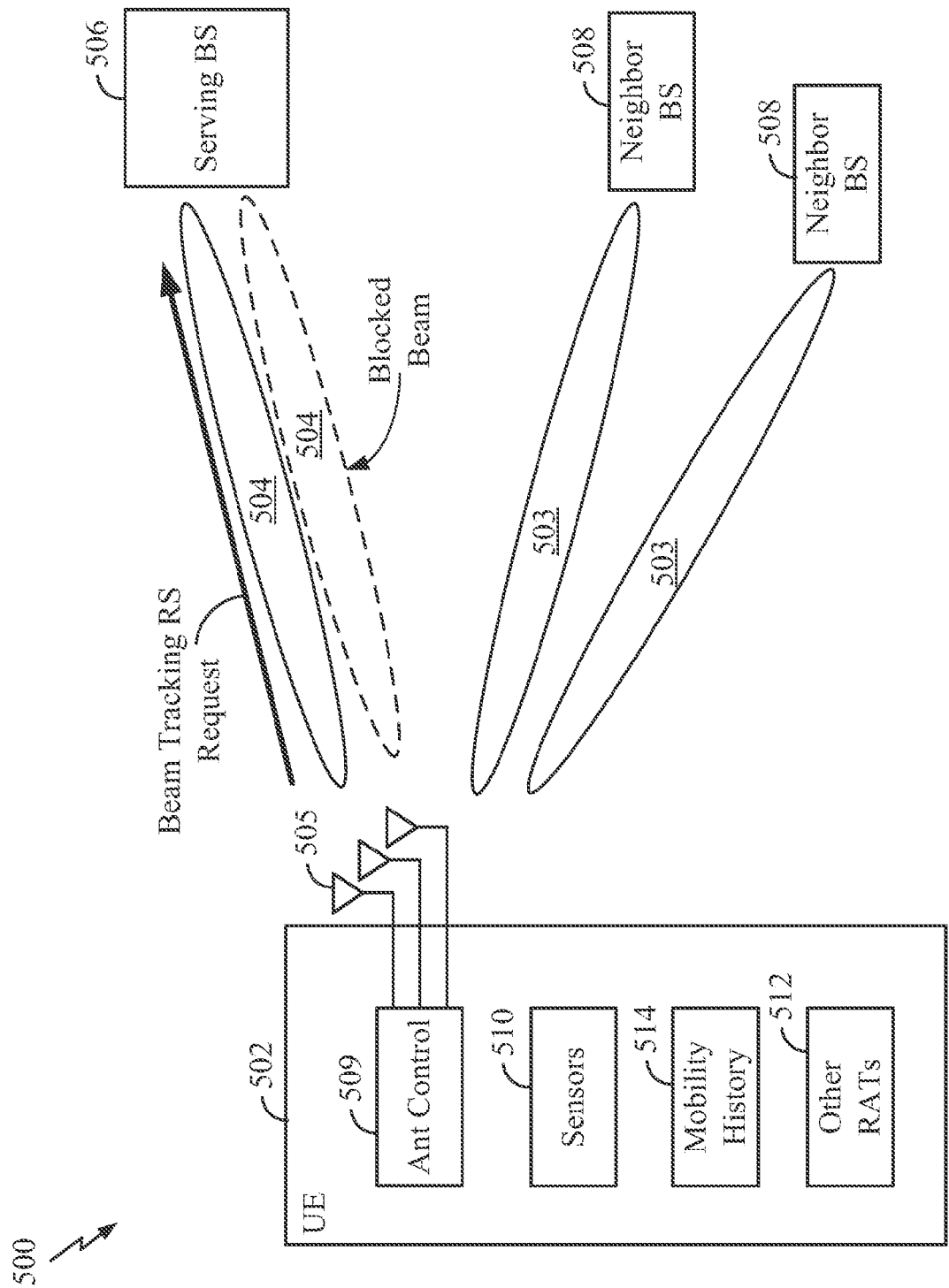
FIG. 5 is a diagram illustrating an exemplary communication system configured for beamforming communications assisted by information derived from various inbuilt sensors of a wireless apparatus according to some aspects of the disclosure.

FIG. 5 is a diagram illustrating an exemplary communication system 500 configured for beamforming communications assisted by information derived from various inbuilt sensors of a wireless apparatus according to some aspects of this disclosure. As shown in FIG. 5, a first wireless apparatus 502 may be configured to transmit and/or receive one or more directional beams (e.g., beams 503 and 504 illustrated in FIG. 5) in various directions utilizing an array of spatially distributed antennas 505. The wireless apparatus 502 may be a UE or scheduled entity as illustrated in any of FIGS. 1-4 or any wireless apparatus. In one example, the beams may be mmWave beams or other extreme high frequency beams. One or more second network nodes, for example, depicted as a serving base station 506 and neighbor base stations 508, may be in wireless communication with the first wireless apparatus 502 (e.g., an UE) utilizing one or more beams 503 and 504. Each of the beams depicted in FIG. 5 may represent an uplink (UL) beam transmitted from the apparatus 502 and/or a downlink (DL) beam transmitted by a base station. For example, the wireless apparatus 502 may receive one or more serving beams 504 from the serving base station 506, and one or more neighbor beams 503 from the neighbor base stations 508.

The beams 503 and 504 are highly directional communication links and are oriented such that the UL beam and a corresponding DL beam point towards each other. For example, the UE 502 may aim a beam 504 to the serving base station 506, and a beam 503 to the neighbor base station 508. Similarly, a base station may aim a beam toward the UE 502. The process for searching and aligning the beams may be referred to as beam acquisition or beam search in this disclosure. In some aspects of the disclosure, beam acquisition may involve the exchange of special signal bursts or sounding frames between the UE 502 and the base stations 506 and 508. However, the initial antenna array configuration selected after beam acquisition may be rendered non-optimal due to any change of the UE orientation and/or relative movement between the UE and the base stations. Therefore, the pair of beams (beam set) between the UE and the base station may be improved or maintained (tracked) by being constantly or periodically updated. This process is called beam tracking in this disclosure. In addition, any change of the propagation path (e.g., blockage or delay spread) between the UE and base station(s) may change the optimal beams and may cause some beams and/or antennas to be blocked.

In some aspects of the disclosure, the wireless apparatus 502 may be configured to perform various radio frequency (RF) measurements per beam to facilitate the determination of the optimal beam set (UL beam and DL beam) and the corresponding antenna array configuration. The wireless apparatus 502 may have an antenna control block 509 that can be utilized to control and configure the antenna array 505. The wireless apparatus 502 may also determine various RF measurements on the beams. Non-limiting examples of RF measurements of a beam include received signal strength indicator (RSSI) measurement, reference signal received power (RSRP), signal-to-noise ratio (SNR), etc.

An antenna array configuration includes, for example, switching speed, amplitude, phase, number of elements, number of elements in columns and rows, direction, beamwidth, gain, and the like. In a certain antenna array configuration, a subset (one or more) of the antennas may be selected or enabled for beamforming operations. In some examples, the wireless apparatus 502 may switch from one subset to another subset of the antennas to track, acquire, and/or reacquire one or more beams from the base stations.

In one aspect of the disclosure, the first wireless apparatus 502 may have one or more inbuilt sensors 510 that may be utilized along with RF measurements to determine a change of the orientation, displacement, and/or position of the wireless apparatus 502. In some examples, the inbuilt sensors 510 may include sensors that can perform RF measurements. In addition, the wireless apparatus 502 may utilize the sensor information provided by the sensors and the RF measurements to detect shadowing. In wireless communication, shadowing occurs when the received signal power fluctuates due to objects obstructing the propagation path between a transmitter and a receiver. For example, shadowing may occur when one or more antennas are blocked.

Some non-limiting examples of the inbuilt sensors 510 are accelerometer, gyroscope, satellite positioning system (e.g., GPS, GLONASS, Galileo, BeiDou), magnetometer, and any sensors or devices that can provide information on the orientation, displacement, and/or position of the wireless apparatus 502. Information provided by these sensors may include position, time, acceleration, orientation, rotation, movement, displacement, and the like.

In some examples, the wireless apparatus 502 may include a radio communication block 512 that can be configured to enable wireless communication with other wireless devices (e.g., base stations) using various radio access technologies (RATs) in addition to the mmWave RAT described above. In general, a RAT refers to the type of technology or communication standard utilized for radio access and communication over a wireless air interface. Some non-limiting examples of other RATs are Bluetooth, WiFi, GSM, UTRA, and E-UTRA (LTE). The communication signals of these RATs may provide information on time and/or position of the wireless apparatus 502. For example, the beacon signals from WiFi and/or Bluetooth access points may be used to determine or estimate the position of the wireless apparatus by for example known triangulation techniques. In other examples, cellular signals may provide the time and locations of the transmitters.

The wireless apparatus 502 may store mobility history 514 at a suitable storage or memory (e.g., a memory 305 of FIG. 3). The mobility history 514 may be implemented as a database or data records that store information on previous mobility events such as cell search, beam search, handovers, radio link failure (RFL), and the associated RF measurements and sensor information. The RF measurements and sensor information may be temporally related to the mobility events in the sense that they are collected at or near the time the mobility events occurred. In some aspects of the disclosure, the RF measurements and/or sensor information may trigger or cause the mobility event to occur. In some examples, the stored beam search information may include angle of arrival (AoA), angle of departure (AoD), beam identification (ID), primary synchronization signal (PSS) ID, secondary synchronization signal (SSS) ID, cell ID, duration of stay on beams, antennas elements used at the UE, beam handovers, RLF, etc., for all the beams previously used or discovered.

In some aspects of the disclosure, some or all of the above-described functional blocks of the apparatus 502 may be included in the processor 304 of FIG. 3. In some examples, the functional blocks may be implemented in the same circuitry or separate circuitries.

Figure 6:
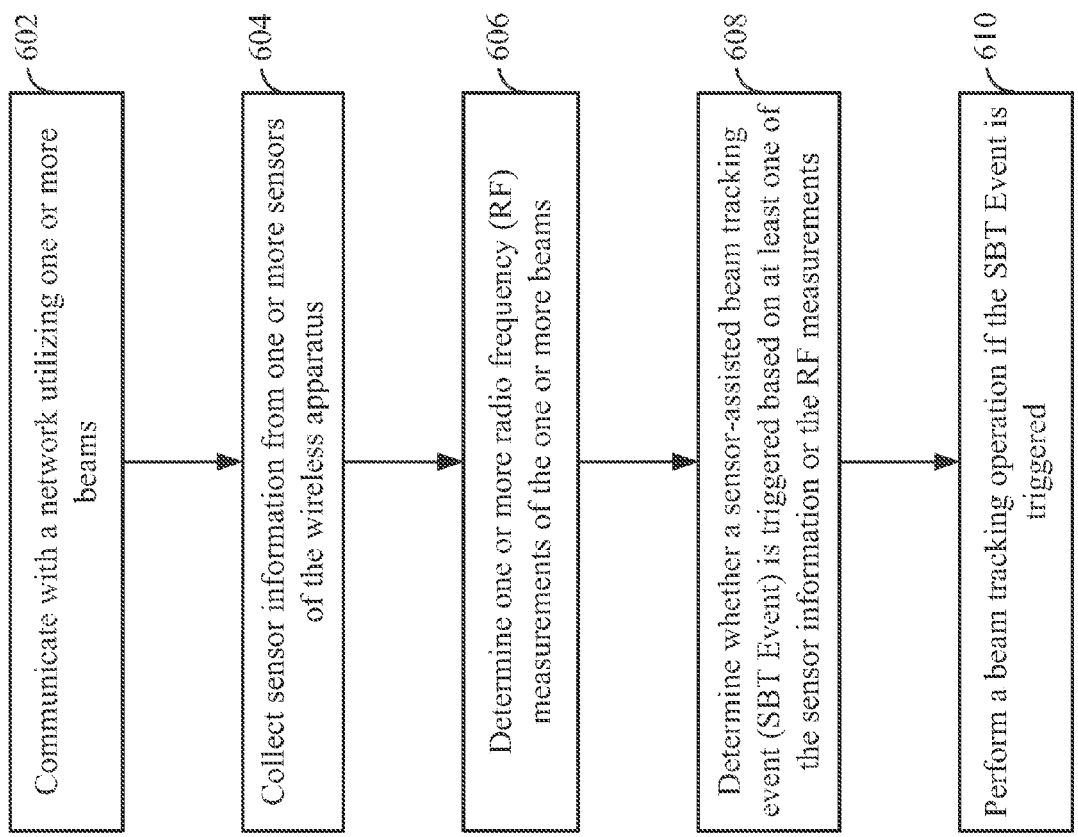
FIG. 6 is a flow chart illustrating an exemplary process for utilizing inbuilt sensors of a wireless apparatus along with radio frequency (RF) measurements to trigger a beam tracking event according to some aspects of the present disclosure.

FIG. 6 is a flow chart illustrating an exemplary process 600 for utilizing inbuilt sensors information along with RF measurements to trigger a beam tracking event at a wireless apparatus according to some aspects of the present disclosure. As described below, some or all illustrated features may be omitted in a particular implementation within the scope of the present disclosure, and some illustrated features may not be required for implementation of all embodiments. In some examples, the process 600 may be carried out by an UE, a wireless apparatus, or a scheduled entity as illustrated in any of FIGS. 1-5 or any suitable apparatus or means for carrying out the functions, processes, or algorithm described below.

At block 602, a wireless apparatus (e.g., a UE or a scheduled entity) communicates with a network node utilizing one or more beams. For example, the wireless apparatus may utilize the antenna array 320 (see FIG. 3) to transmit and receive one or more beams (e.g., beams 503 and 504 of FIG. 5) to and from a network node (e.g., a base station). In one example, the apparatus may utilize the TX processor 468, transmitter 454TX, and/or antennas 452 to perform beamforming operations, for example, including precoding, spatial multiplexing, and/or diversity coding. The apparatus may select one or more antennas (a subset of antennas) to transmit and receive the beams.

At block 604, the wireless apparatus collects sensor information from one or more sensors (e.g., inbuilt sensors). For example, the sensors may be the sensors 328 (see FIG. 3) or any sensors or transducers that may provide information on the orientation, displacement, time, and/or position of the device. At block 606, the wireless apparatus determines one or more RF measurements of the one or more beams. For example, the wireless apparatus may utilize the RF measurements block 338 (see FIG. 3) to obtain various RF measurements of the beams or signals such as RSSI, RSRP, SNR, and the like.

In one example, each time when the apparatus obtains or samples data from its sensors, the apparatus may utilize its modem, which may include the receivers 454RX and/or RX processor 456, channel estimator 458, and/or controller 459, to determine various RF measurements, including the beam angle, RSSI, RSRP, and SNR of the one or more beams. These components may be included in the RF measurements block 338 of FIG. 3. The apparatus may store the RF measurements with the associated sensor data or information collected as described above in block 604. That is, the RF measurements and the associated sensor information may be stored as one data set or associated data that are temporally related.

At block 608, the wireless apparatus determines whether a sensor-assisted beam tracking event (SBT Event) is triggered based on the sensor information and the RF measurements, or a data set of sensor information and associated RF measurements. For example, the SBT Event may be triggered when a change in at least one of a location, an orientation, a displacement, or a shadowing of the wireless apparatus, is greater than a certain predetermined threshold based on the sensor information and/or RF measurements. In some examples, the SBT Event may include or trigger an UE initiated UL transmission, for example, to request beam tracking reference signals (beam-tracking resources) from a base station. The wireless apparatus may utilize the UE initiated UL transmission to report the reasons for triggering the SBT Event, for example, due to a change in UE orientation, blocking, SNR degradation etc. For example, the wireless apparatus may utilize the P-O block 330 (see FIG. 3) to determine a change of its location, orientation, displacement, or shadowing in a way that is faster and/or not feasible with RF measurements alone. In some examples, the wireless apparatus may collect or sample data from the sensors at a predetermined frequency. For example, the apparatus may sample data from the sensors for each time step t. The time step t may be a predetermined fixed value or variable value. For example, the sensors may have a sampling rate of 50 Hz or higher, or a variable sampling rate. Certain sensors can be operated at for example 100 Hz or other frequencies. In some examples, a gyroscope having a sampling rate as high as 1 KHz may be used. Based on this sensor information, the apparatus can determine a change of its orientation and/or position quickly from a few milliseconds or tens of milliseconds. An exemplary process for determining a change in at least one of a location, an orientation, a displacement, or a shadowing is described in more detail below in relation to FIG. 7.

The sensor data for n number of sensors may be represented as a sensor data set $(x_1, x_2, x_3, \ldots x_n)$, where $x_i$ is the sensor data for sensor i. Each sensor data may represent the sensor data collected at a certain time point. A predetermined number of sensor data sets (e.g., sensor data 346) may be stored in the apparatus based on the storage availability and design of the apparatus. In some aspects of the disclosure, the sensor data may be filtered and normalized for each sensor. In one example, the UE may be configured to apply an infinite impulse response (IIR) filter on the sensor data $x_i$, remove the mean, and standardize the data $x_i$ to be unit variance. In other aspects of the disclosure, other normalization and standardization methods may be used.

At block 610, the wireless apparatus may utilize the beam tracking block 334 to perform a beam tracking operation if the SBT Event is triggered. In one aspect of the disclosure, when the SBT Event is triggered, the wireless apparatus may transmit a request to the base station(s) to ask for beam tracking resources to facilitate beam tracking operation. For example, in response to the request, the base station(s) may transmit one or more beam tracking reference signals. The apparatus may utilize the beam tracking block 334 to perform various beam tracking operations based on the beam tracking reference signals. For example, the beam tracking operations may include changing or adjusting the beam pattern or direction to improve beam tracking. In some examples, the wireless apparatus may turn on/off or switch different antenna(s) of the antenna array 320 to change the beam pattern and/or direction. In some examples, the wireless apparatus may change the signal phase of one or more antennas to change the beam pattern and/or direction. In some examples, the wireless apparatus may change the beam pattern and/or direction by applying different precoding matrices.

In some aspects of the disclosure, based on the sensor information and the RF measurements, the apparatus may determine the optimal antenna array configuration to track the beams. For example, the apparatus may switch from using a first subset of antennas to a second subset of antennas that may produce better RF measurements (e.g., AoA, AoD, duration of stay on beams, etc.). In an aspect of the disclosure, one or more antennas may be blocked by a hand or a part of the body of a user, causing shadowing. In such scenario, the apparatus may utilize different antennas (or sub-arrays) to check for a received signal quality (e.g., beam RSRP, RSSI, etc.) from a different direction. For example, the apparatus may cycle through different antenna sub-arrays oriented in different directions to determine the better direction for tracking the beams. In some examples, the apparatus may track multiple beams including a serving beam 504 from a serving base station and one or more neighbor beams 503 from one or more neighbor base stations.

Figure 7:
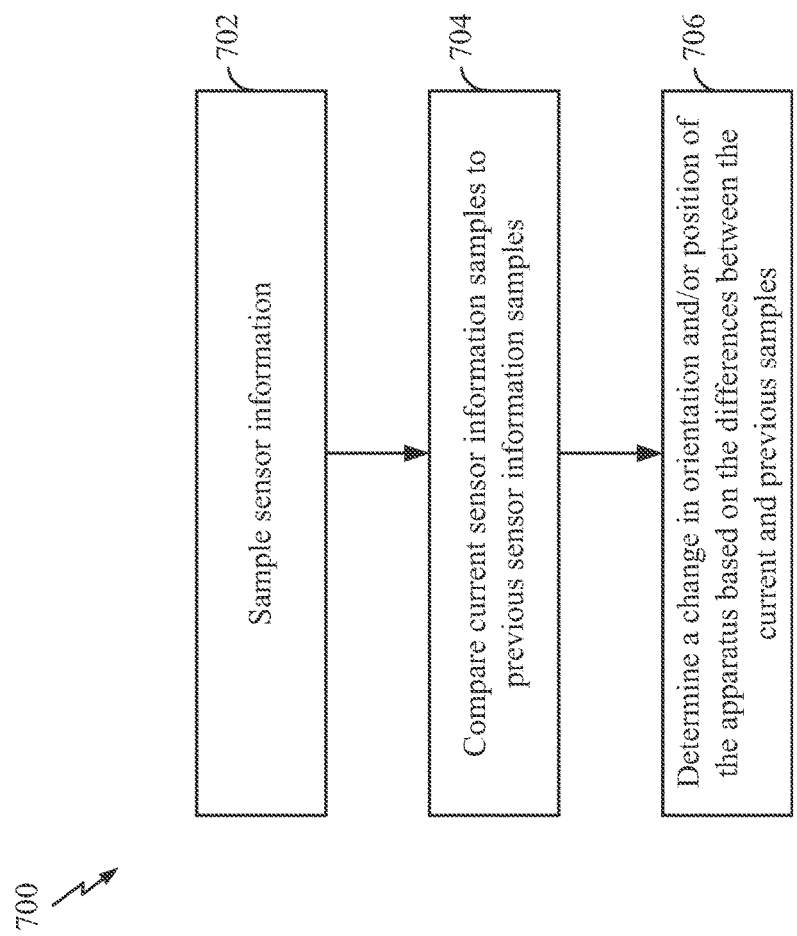
FIG. 7 is a diagram illustrating an exemplary process for detecting a change of the orientation and/or position of an apparatus utilizing sensor information according to an aspect of the disclosure.

FIG. 7 is a diagram illustrating an exemplary process 700 for detecting a change of the orientation and/or position of an apparatus utilizing sensor information according to an aspect of the disclosure. The process 700 may be performed by any of the wireless apparatuses illustrated in FIGS. 1-5. At block 702, an apparatus samples the sensor information, for example, for each time step t. In some aspects of the disclosure, the sensors may be the same as the sensors 328 of FIG. 3 or sensors 510 of FIG. 5. For example, the sensors may include one or more of an accelerometer, a gyroscope, a satellite navigation receiver, or a magnetometer, or any sensors that can provide position, location, time, and/or orientation information. The sampled sensor information may be stored in the computer-readable medium 306 and/or memory 305 as sensor data 346. Multiple data samples may be stored for each sensor (e.g., multiple sensor data sets for different time).

At block 704, the apparatus compares current or latest sensor information samples to previous or stored sensor information samples. For example, the apparatus may utilize the P-O block 330 to compare the sensor information samples of different time. At block 706, the apparatus may determine a change in its orientation and/or position based on the differences between the current and previous samples. For example, it may be determined that the apparatus has a certain displacement or movement in a certain direction. It may also be determined that the apparatus has a new orientation or tilt that may be defined as a change in azimuth and/or altitude. In some examples, the orientation may be defined in azimuth, pitch, and roll. In some aspects of the disclosure, the apparatus may detect shadowing based on the changed orientation and/or position and the corresponding change in RF measurements. For example, a signal quality degradation that coincides a changed orientation and/or position may indicate shadowing.

In some aspects of the disclosure, the apparatus may utilize a learning algorithm to determine whether or not a BST Event is triggered as described above in relation to FIGS. 6 and 7. The relationship between sensor data and/or RF measurements and triggering of the BST Event may be non-linear or difficult to define with explicit rules or conditions. Unnecessarily triggering beam tracking can waste power and network resources. Using a learning algorithm, the apparatus can learn from past BST Event triggering results to improve future BST Event triggering to order to perform beam tracking. Some exemplary learning algorithms are logistic regression or support vector machines. In one example, sensor data are obtained from n number of sensors. Let $(x_1, x_2, x_3, \ldots x_n)$ represents the sensor inputs at a certain time, where $x_i$ is the sensor data for sensor i. Using a logistic regression model with model weights matrix θ, a function for determining whether or not to trigger beam tracking may be defined as follows:

$$h_\theta(x) = \frac{1}{1 + \exp(-\theta^T x)}$$

If it is determined that $h_\theta(x)>0$, a beam tracking event is triggered; otherwise, no beam tracking event is triggered. The model weights θ may be learned a priori (e.g., learned weights) or learned online with each new data received and updated. The above-described function $h_\theta(x)$ is only an example, and other suitable learning functions may be used.

Figure 8:
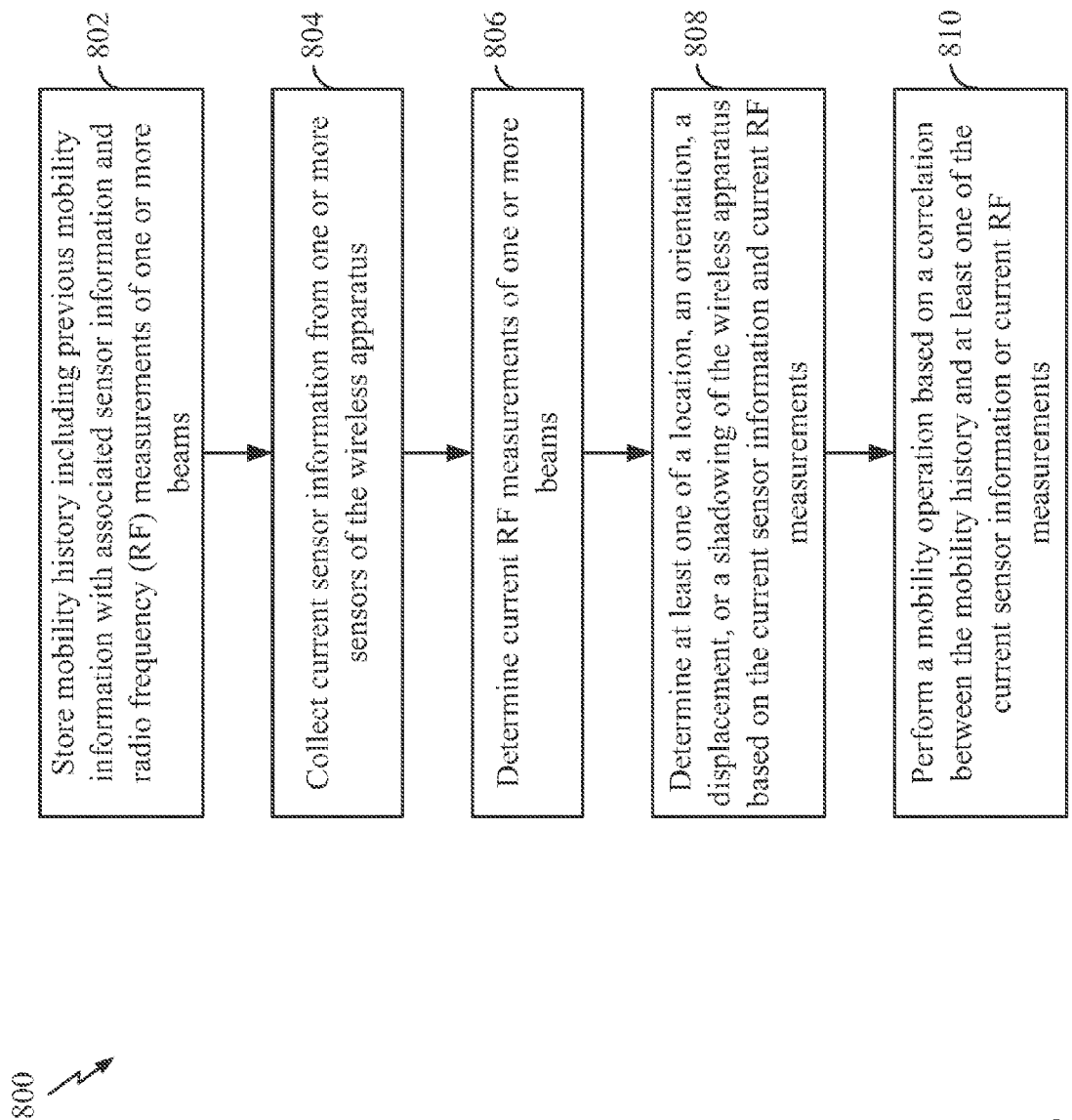
FIG. 8 is a flow chart illustrating an exemplary process for utilizing inbuilt sensors of an apparatus along with RF measurements and mobility history to assist mobility operation according to some aspects of the present disclosure.

FIG. 8 is a flow chart illustrating an exemplary process 800 for utilizing inbuilt sensors of a wireless apparatus along with RF measurements and mobility history to assist mobility operation according to some aspects of the present disclosure. The process 800 may be performed by any of the wireless apparatuses illustrated in FIGS. 1-5 or any suitable wireless devices. In some examples, mobility history together with the corresponding sensor information and RF measurement, may facilitate a beam search, a neighbor beam search, a handover, and/or other mobility events.

At block 802, a wireless apparatus (e.g., a UE) stores mobility history including previous mobility information with the associated sensor information and RF measurements of one or more beams. The associated sensor information and RF measurements may coincide with the mobility events corresponding to the mobility information. That is, the sensor information and RF measurements may be collected at or near the time when the mobility information or history is generated. In some examples, the wireless apparatus may store the mobility information or history 348 in the memory 305 or computer-readable medium 306 (see FIG. 3). The stored mobility history may include various mobility events such as a cell search result, a beam search result, a handover history, RLF information, and other mobility information. For example, the wireless apparatus may store the sensor information or data (e.g., multiple data sets) obtained or measured at or near each time step t when these mobility events occurred. In addition, the wireless apparatus may store the RF measurements 344 of the beams at or near the time when the stored mobility events occurred.

In some examples, a wireless apparatus' position and mobility tend to be correlated over time. For example, a user may often use a smart phone or wireless apparatus at certain places in certain orientations, and take the same routes between certain locations (e.g., home and office). Therefore, such wireless apparatus may experience similar beam-to-beam handovers, RLFs, beam tracking, and other mobility events, over a period of time or regularly. Aspects of the present disclosure utilize stored mobility information and associated sensor information and RF measurements to assist an initial beam search and acquisition, a neighbor beam search, a handover, etc.

At block 804, the wireless apparatus collects current sensor information from one or more sensors (e.g., sensors 328) using processes similar to those described above in relation to FIGS. 6 and 7. At block 806, the wireless apparatus determines current RF measurements of one or more beams using processes similar to those described above in relation to FIGS. 6 and 7. The wireless apparatus may communicate with one or more base stations using the one or more beams. For example, the wireless apparatus may utilize the RF measurements block 338 to determine various RF measurements of one or more beams or signals such as RSSI, RSRP, SNR, and the like.

In some examples, the apparatus may be in a sleep mode or a discontinuous reception (DRX) cycle (e.g., wake up every 256 msec). During the sleep mode, its RF circuitry may be powered off and no RF measurement will be available. In this case, prior to waking up from sleep, the apparatus may check its sensors, and if there is no significant changes in the sensor information, the apparatus can wake up using the same beam (i.e., no BST Event triggered). However, if the sensor information indicates that a BST Event is triggered, then the UE can perform beam tracking before waking up and decode the received data during wakeup using a better beam.

At block 808, the wireless apparatus utilizes the P-O block 330 to determine at least one of a location, an orientation, a displacement, or a shadowing of the wireless apparatus based on the current sensor information and current RF measurements. The current sensor information may indicate the orientation and/or position of the apparatus. The wireless apparatus may utilize the P-O block 330 to determine its current position based on the current sensor information. The current position of the wireless apparatus may include its position (location) and/or orientation. In some aspects of the disclosure, the wireless apparatus may determine its position from information provided from other RATs (e.g., WiFi, Bluetooth, cellular, WiMax, etc.) if supported. For example, the determined position may have a resolution depending on the accuracy and capability of the sensors. In some examples, the position may be specified in latitude and longitude, a predetermined address, a cell ID, sector ID, a public land mobile network (PLMN) ID, a network ID. Each of the cell ID, PLMN ID, sector ID, and network ID may be associated with a known position, address, or geographical region. The orientation of the wireless apparatus may be utilized to determine the directions to which its antennas are respectively pointed to, for example, in reference to a known direction (e.g., east, south, west, or north) or any known reference points.

At block 810, the wireless apparatus may utilize the mobility block 332 to perform a mobility operation based on a correlation between the mobility history and at least one of the current sensor information or current RF measurements. The correlation may be determined according to the process 900 as described in relation to FIG. 9 below.

In some aspects of the disclosure, the correlation may indicate a difference between the current position and the historical position(s) derived from the previous mobility information and associated sensor information and RF measurements. A high or strong correlation may indicate that the current position is within a predetermined distance from the position(s) where the one or more of the previously stored mobility information, associated sensor information, and RF measurements, were obtained or measured. Based on the correlation, the wireless apparatus may predict the suitable antenna configuration, serving base station beam, neighbor base station beam for the current position of the wireless apparatus, and/or handover target. Therefore, the wireless apparatus may streamline a mobility operation, for example including a beam search, a neighbor beam search, and/or a handover, based on the determined correlation. That is, streamlining means that the wireless apparatus may start the beam search, neighbor beam search, and/or handover, with an initial configuration (e.g., antenna array configuration) that is more likely to reduce time and resources used by the wireless apparatus.

Figure 9:
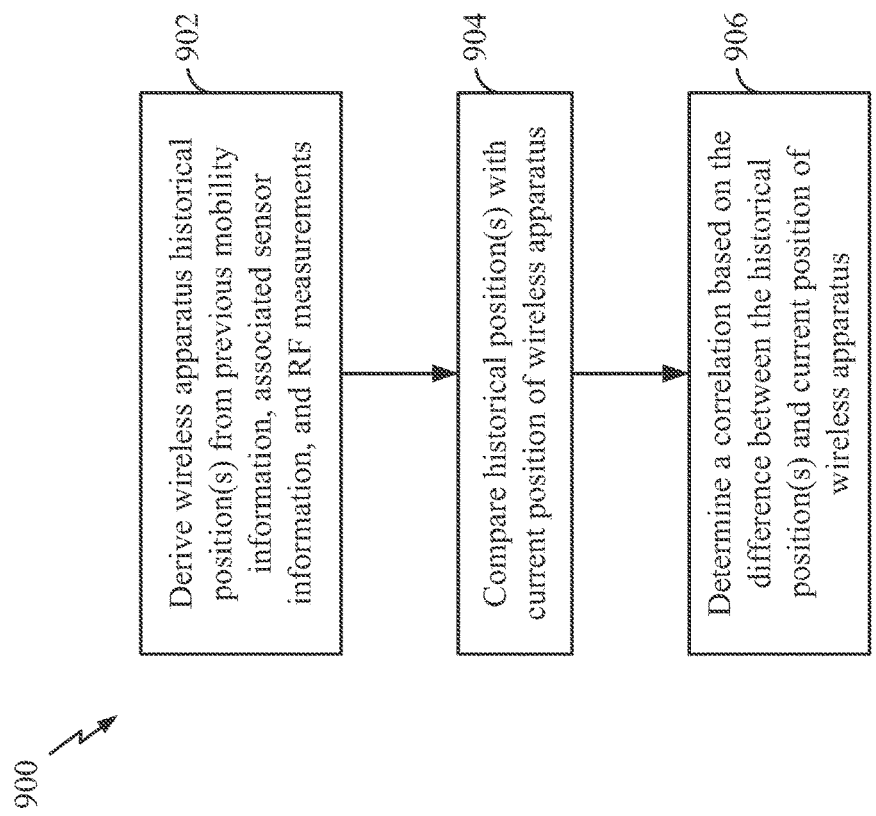
FIG. 9 is a flow chart illustrating an exemplary process for determining a correlation between the current position and historical position(s) of an apparatus based on at least one of previous mobility information and associated sensor information and RF measurements according to some aspects of the present disclosure.

FIG. 9 is a flow chart illustrating an exemplary process 900 for determining the correlation between the current position and historical position(s) of an apparatus based on at least one of previous mobility information and associated sensor information and RF measurements according to some aspects of the present disclosure. The process 900 may be performed by any of the wireless apparatuses illustrated in FIGS. 1-5 or any suitable wireless devices.

At block 902, the wireless apparatus derives or determines one or more historical position(s) from previously stored mobility information (e.g., mobility history 348), associated sensor information (e.g., sensor data 346), and RF measurements (e.g., RF data 350). The historical position may correspond to the position and/or orientation of the wireless apparatus when the corresponding or coinciding mobility information, sensor information, and/or RF measurements were collected or measured. At block 904, the wireless apparatus compares the historical position(s) with its current position. The wireless apparatus may determine its current position utilizing one or more sensors 328 and RF measurements, for example, as described above in relation to FIGS. 6-8. For example, the current position may be defined in latitude and longitude, a predetermined address, a cell ID, a public land mobile network (PLMN) ID, a sector ID, a network ID, or any known geographical region. The current position may also indicate the orientation of the device, in particular, the orientation of its antenna array.

Figure 10:
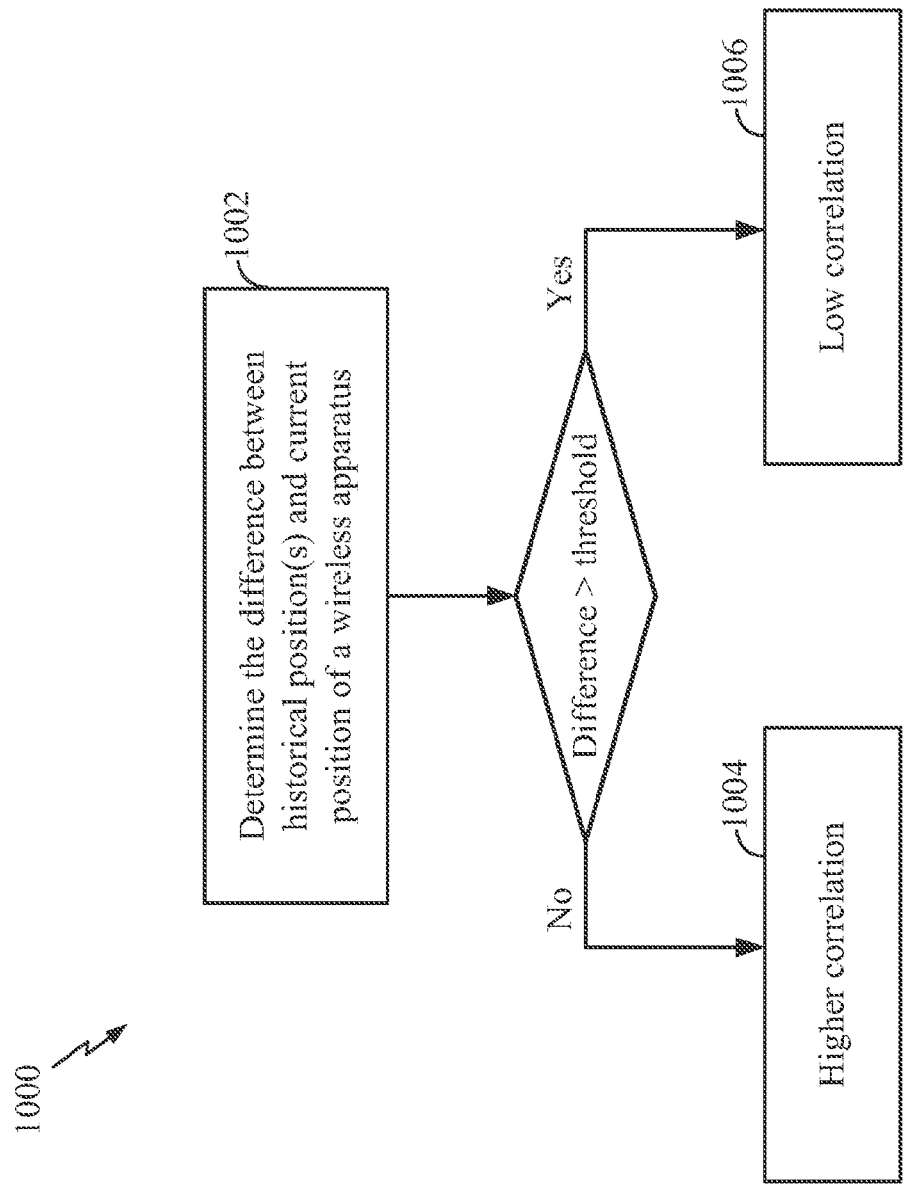
FIG. 10 is a flow chart illustrating an exemplary process for determining different levels of correlation between the current position and historical position(s) of an apparatus according to some aspects of the present disclosure.

At block 906, the wireless apparatus determines a correlation based on the difference between the historical position(s) and current position of the wireless apparatus. Referring to FIG. 10, at block 1002, the wireless apparatus determines the difference between its historical position(s) and current position. If the difference between the historical position and the current position is a higher than a predetermined threshold, it is determined that there is a high correlation 1004; otherwise, it is determined that there is a low correlation 1006. A higher correlation generally indicates that the degree of similarity between the current position and the historical position (location/orientation) is higher.

Figure 11:
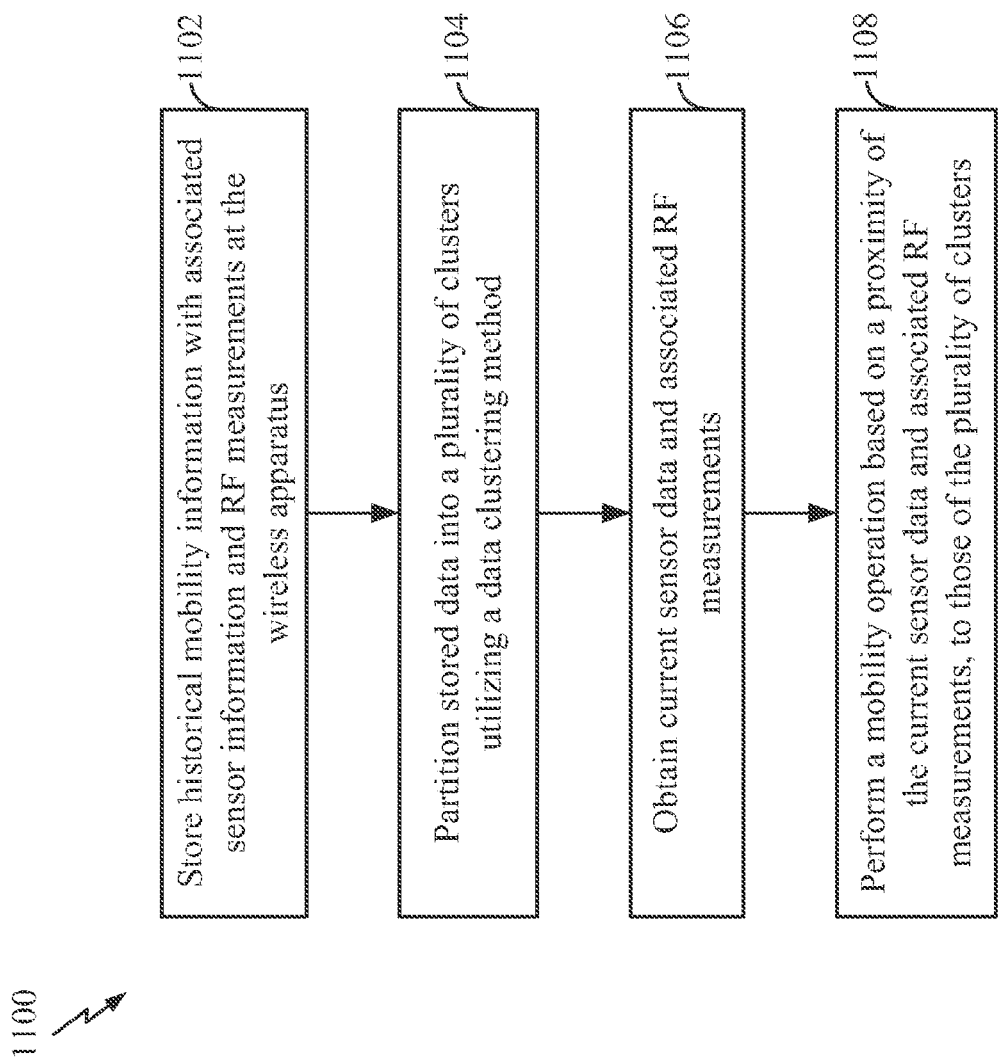
FIG. 11 is a flow chart illustrating an algorithm for utilizing inbuilt sensors of an apparatus along with RF measurements and mobility history to assist mobility operation according to some aspects of the present disclosure.

FIG. 11 is a flow chart illustrating an algorithm 1100 for utilizing inbuilt sensors of an apparatus along with RF measurements and mobility history to assist mobility operation according to some aspects of the present disclosure. The algorithm 1100 may be performed by any of the wireless apparatus illustrated in FIGS. 1-5 or any suitable wireless devices. In some examples, some or all procedures of the algorithm 1100 may be combined with or replace some of the processes described in relation to FIGS. 6-10.

At block 1102, a wireless apparatus (e.g., an UE) stores historical or previous mobility information with the associated sensor information and RF measurements at the wireless apparatus. For example, the wireless apparatus may store the historical or previous mobility information in a memory 305 or computer-readable storage 306 (see FIG. 3) as mobility history 348. The stored historical mobility information may include various mobility events such as a cell search result, a beam search result, a handover history, RLF information, and other commonly known mobility information or events. The wireless apparatus also stores the sensor information or data (e.g., data sets) obtained or measured at or near the time when these mobility events occurred. In addition, the wireless apparatus may store the RF measurements of the beams at or near the time when the stored mobility events occurred. The wireless apparatus stores a sufficient amount of data for the historical or previous mobility information as well as the associated sensor information and RF measurements such that the wireless apparatus may utilize the stored historical data to assist future mobile decisions such as a beam search, a neighbor beam search, a handover, and the like.

Figure 12:
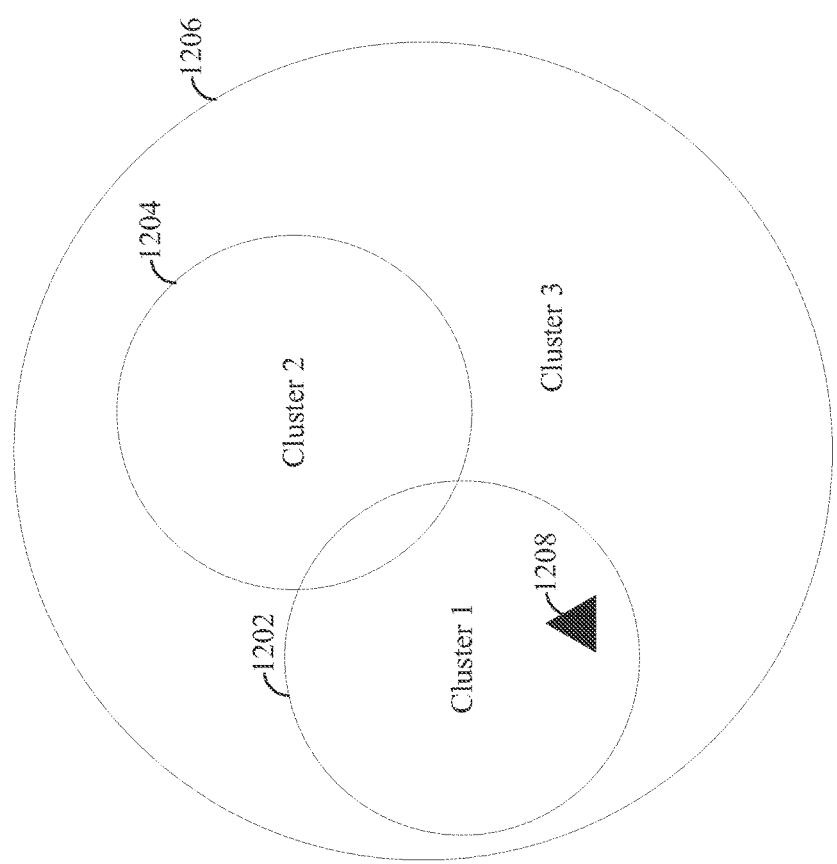
FIG. 12 is an Euler diagram illustrating the relationship between different clusters for grouping sensor information, RF measurements, and mobility information according to some aspects of the present disclosure.

At block 1104, the wireless apparatus utilizes the mobility block 332 to partition the stored data (i.e., sensor information, RF measurements, and mobility information) into a plurality of clusters or regions (e.g., three exemplary clusters illustrated in FIG. 12). Similar data are grouped into the same cluster or region. The apparatus may utilize any known data clustering method to partition the data into clusters. Clustering as described in this disclosure is a statistical technique that groups a set of objects or data in such a way that the objects in the same cluster are more similar to each other than to those in other clusters. Some exemplary clustering methods are K-means and Gaussian mixture model that are known in the art. FIG. 12 is an Euler diagram illustrating the relationship between different clusters for grouping sensor information, RF measurements, and mobility information according to some aspects of the present disclosure. In FIG. 12, data corresponding to similar positions, similar RF measurements, and/or similar mobility outcomes, may be put into the same cluster. For example, data with similar positions may be grouped into a first cluster 1202, data with similar RF measurements may be grouped into a second cluster 1204; and data with similar mobility outcomes may be group into a third cluster 1206. In this example, the clusters may be overlapped. That is, data may be grouped into multiple clusters. In other examples, the clusters may not overlap each other. A cluster may be associated with or indicate one or more of a beam search direction, a neighbor beam search direction, and/or a handover target.

At block 1106, the wireless apparatus obtains current sensor data and the associated RF measurements as described above. The wireless apparatus may obtain the sensor data at each time step t, which may be a predetermined fixed value or variable value as described above in relation to FIGS. 6 and 7. At block 1108, the wireless apparatus performs a mobility operation based on a proximity of the current sensor data and associated RF measurements, to those of the plurality of clusters. For example, when using a K-means clustering algorithm, the proximity may be defined as the L2 norm between the current sensor data x 1208 and the center of the clusters. For example, if the closest cluster indicates a beam search direction, the wireless apparatus may configure its antenna array and/or other circuitry to perform a beam search in the indicated direction. Similarly, the wireless apparatus may configure its antenna array and/or other circuitry to perform a neighbor beam search in the indicated direction. In another example, if the closest cluster indicates a handover target, the wireless apparatus may configure its antenna array and/or other circuitry to search for the handover target and/or perform a handover to the target.

In various configurations, the apparatus 300 for wireless communication includes means for performing the various processes and functions described in relation to FIGS. 6-12. In one aspect, the aforementioned means may be the processor 304 in which the invention resides from FIG. 3 configured to perform the functions recited by the aforementioned means. In another aspect, the aforementioned means may be a circuit or any apparatus configured to perform the functions recited by the aforementioned means.

Of course, in the above examples, the circuitry included in the processor 304 is merely provided as an example, and other means for carrying out the described functions may be included within various aspects of the present disclosure, including but not limited to the instructions stored in the computer-readable storage medium 306, or any other suitable apparatus or means described in any one of the FIG. 1, 2, 4, or 5, and utilizing, for example, the processes and/or algorithms described herein in relation to FIGS. 6-12.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM) and similar cellular systems. Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-12 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-12 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication operable at a wireless apparatus, comprising:
   communicating with a network utilizing one or more beams;
   collecting sensor information from one or more sensors of the wireless apparatus;
   determining one or more radio frequency (RF) measurements of the one or more beams;
   determining whether a sensor-assisted beam tracking event (SBT Event) is triggered based on a learning algorithm utilizing the sensor information and the RF measurements; and
   performing a beam tracking operation when the SBT Event is triggered, the beam tracking operation comprising:
   transmitting a request to the network for one or more beam-tracking reference signals; and
   reconfiguring an antenna array of the wireless apparatus based on the one or more beam-tracking reference signals to switch from a first subset of antennas to a second subset of antennas of the antenna array to track the one or more beams.

2. The method of claim 1, wherein the determining the triggering of the SBT Event comprises:
   determining $$h_\theta(x) = \frac{1}{1 + \exp(-\theta^T x)},$$

wherein θ is a learned weights matrix of a model and x is sensor data corresponding to the sensor information; and
   if $h_\theta(x)>0$, triggering the SBT Event.

3. The method of claim 1, wherein the one or more sensors comprises at least one of an accelerometer, a gyroscope, a satellite navigation receiver, or a magnetometer.

4. The method of claim 1, wherein the communicating comprises:
   communicating with a serving base station utilizing a first beam; and
   communicating with a neighbor base station utilizing a second beam different from the first beam.

5. The method of claim 1, wherein the one or more beams comprise millimeter wave (mmWave) beams.

6. The method of claim 1, wherein the determining the triggering of the SBT Event comprises:
   determining a change in at least one of a location, an orientation, a displacement, or a shadowing of the wireless apparatus based on at least one of the sensor information or the RF measurements.

7. The method of claim 1, further comprising:
   storing information comprising the sensor information and the RF measurements, and
   utilizing the stored information to configure an antenna array to facilitate at least one of an initial beam search, a neighbor beam search, or a handover.

8. The method of claim 1, wherein the learning algorithm is based on logistic regression or a support vector machine.

9. A method of wireless communication operable at a wireless apparatus, comprising:
   storing mobility history comprising previous mobility information with associated sensor information and radio frequency (RF) measurements of one or more beams, the previous mobility information comprising at least one of a cell search result, a beam search result, a handover history, or radio link failure information;
   collecting current sensor information from one or more sensors of the wireless apparatus;
   determining current RF measurements of one or more beams;
   determining a correlation between the mobility history, and the current sensor information and current RF measurements, the correlation indicating a difference between a current position and historical positions of the wireless apparatus derived from the mobility history; and
   streamlining a mobility operation based on the correlation.

10. The method of claim 9, wherein the streamlining the mobility operation comprises:
    establishing an initial configuration based on the correlation; and
    performing at least one of a beam search, a neighbor beam search, or a handover based on the initial configuration.

11. The method of claim 9, further comprising:
    reconfiguring an antenna array of the wireless apparatus to track one or more millimeter wave (mmWave) beams based on the correlation.

12. The method of claim 9, wherein the one or more sensors comprise at least one of an accelerometer, a gyroscope, a satellite navigation receiver, or a magnetometer.

13. The method of claim 9, further comprising:
    partitioning the mobility history into a plurality of clusters utilizing a data clustering method, wherein the streamlining the mobility operation is further based on a proximity of the current sensor information and current RF measurements, to one or more of the plurality of clusters.

14. The method of claim 13, wherein the data clustering method comprises at least one of a K-means clustering method or a Gaussian mixture model method.

15. A wireless apparatus, comprising:
a communication interface configured to communicate with a network utilizing one or more beams;
a memory stored with executable code;
one or more sensors; and
a processor operatively coupled with the communication interface, the one or more sensors, and the memory,
wherein the processor is configured by the executable code to:
collect sensor information from the one or more sensors;
determine one or more radio frequency (RF) measurements of the one or more beams;
determine whether a sensor-assisted beam tracking event (SBT Event) is triggered based on a learning algorithm utilizing the sensor information and the RF measurements; and
perform a beam tracking operation when the SBT Event is triggered, the beam tracking operation comprising:
transmitting a request to the network for one or more beam-tracking reference signals; and
reconfiguring an antenna array of the wireless apparatus based on the one or more beam-tracking reference signals to switch from a first subset of antennas to a second subset of antennas of the antenna array to track the one or more beams.

16. The wireless apparatus of claim 15, wherein the processor is further configured to determine the triggering of the SBT Event by:
determining $$h_\theta(x) = \frac{1}{1 + \exp(-\theta^T x)},$$

wherein θ is a learned weights matrix of a model and x is sensor data corresponding to the sensor information; and
if $h_\theta(x) > 0$, triggering the SBT Event.

17. The wireless apparatus of claim 15, wherein the one or more sensors comprises at least one of an accelerometer, a gyroscope, a satellite navigation receiver, or a magnetometer.

18. The wireless apparatus of claim 15, wherein the processor is further configured to:
communicate with a serving base station utilizing a first beam; and
communicate with a neighbor base station utilizing a second beam different from the first beam.

19. The wireless apparatus of claim 15, wherein the one or more beams comprise millimeter wave (mmWave) beams.

20. The wireless apparatus of claim 15, wherein the processor is further configured to determine the triggering of the SBT Event by:
determining a change in at least one of a location, an orientation, a displacement, or a shadowing of the wireless apparatus based on at least one of the sensor information or the RF measurements.

21. The wireless apparatus of claim 15, wherein the processor is further configured to:
store information comprising the sensor information and the RF measurements, and
utilize the stored information to configure an antenna array to facilitate at least one of an initial beam search, a neighbor beam search, or a handover.

22. The wireless apparatus of claim 15, wherein the learning algorithm is based on logistic regression or a support vector machine.

23. A wireless apparatus comprising:
a communication interface configured to communicate with a network utilizing one or more beams;
one or more sensors configured to provide sensor information;
a memory stored with executable code; and
a processor operatively coupled with the communication interface, the one or more sensors, and the memory,
wherein the processor is configured by the executable code to:
store mobility history comprising previous mobility information with the associated sensor information and radio frequency (RF) measurements of the one or more beams, the previous mobility information comprising at least one of a cell search result, a beam search result, a handover history, or radio link failure information;
collect current sensor information from the one or more sensors;
determine current RF measurements of the one or more beams;
determine a correlation between the mobility history, and the current sensor information and current RF measurements, the correlation indicating a difference between a current position and historical positions of the wireless apparatus derived from the mobility history; and
streamline a mobility operation based on the correlation.

24. The wireless apparatus of claim 23, wherein the processor is further configured to:
reconfigure an antenna array of the wireless apparatus to track one or more millimeter wave (mmWave) beams based on the correlation.

25. The wireless apparatus of claim 23, wherein the one or more sensors comprise at least one of an accelerometer, a gyroscope, a satellite navigation receiver, or a magnetometer.

26. The wireless apparatus of claim 23, wherein the processor is further configured to:
partition the mobility history into a plurality of clusters utilizing a data clustering method; and
streamline the mobility operation further based on a proximity of the current sensor information and current RF measurements, to one or more of the plurality of clusters.

27. The wireless apparatus of claim 26, wherein the data clustering method comprises at least one of a K-means clustering method or a Gaussian mixture model method.

28. The wireless apparatus of claim 23, wherein the processor, being configured by the executable code to streamline the mobility operation, is further configured to:
establish an initial configuration based on the correlation; and
perform at least one of a beam search, a neighbor beam search, or a handover based on the initial configuration.

* * * * *